United States Patent
Berryman

(10) Patent No.: US 6,269,311 B1
(45) Date of Patent: Jul. 31, 2001

(54) DISCRIMINATION OF POROSITY AND FLUID SATURATION USING SEISMIC VELOCITY ANALYSIS

(75) Inventor: James G. Berryman, Danville, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/417,515

(22) Filed: Oct. 13, 1999

(51) Int. Cl.⁷ ................................................ G01V 1/28
(52) U.S. Cl. ................................................ 702/18; 367/75
(58) Field of Search ................................ 367/75; 702/14, 702/16, 17, 18, 12, 13

(56) References Cited

U.S. PATENT DOCUMENTS

| | | |
|---|---|---|
| 3,126,976 | 3/1964 | Cordell et al. ............................ 181/5 |
| 3,252,131 | 5/1966 | Vogel ........................................ 340/18 |
| 3,362,011 | 1/1968 | Zemanek .................................. 340/18 |
| 3,622,969 | 11/1971 | Lebreton et al. ................... 340/15.5 |
| 3,720,098 | 3/1973 | Dixon ..................................... 73/67.7 |
| 3,975,674 | 8/1976 | McEuen ................................ 293/480 |
| 4,316,267 | 2/1982 | Ostrander ................................ 367/68 |
| 4,316,268 | 2/1982 | Ostrander ................................ 367/68 |
| 4,375,090 | 2/1983 | Thompson et al. ..................... 367/76 |
| 4,393,486 | 7/1983 | Thompson et al. ..................... 367/73 |
| 4,398,273 | 8/1983 | Thompson et al. ..................... 367/73 |
| 4,399,525 | 8/1983 | Thompson et al. ..................... 367/75 |
| 4,524,432 | 6/1985 | Johnson ................................. 367/25 |
| 4,562,588 | 12/1985 | Ostrander ................................ 367/68 |
| 4,571,710 | 2/1986 | Neidell et al. .......................... 367/38 |
| 4,577,690 | 3/1986 | Medlin ................................. 166/251 |
| 4,604,734 | 8/1986 | Ruehle .................................... 367/63 |
| 4,636,994 | 1/1987 | Fertl et al. .............................. 367/75 |
| 4,672,588 | 6/1987 | Willen .................................... 367/28 |
| 4,692,910 | 9/1987 | Sondergeld et al. .................... 367/75 |
| 4,719,607 | 1/1988 | Airhart ................................. 367/189 |
| 4,755,972 | 7/1988 | Hanson et al. .......................... 367/75 |
| 4,813,028 | 3/1989 | Liu ......................................... 367/31 |
| 4,831,530 | 5/1989 | Rai ....................................... 364/421 |
| 4,843,598 | 6/1989 | Medlin .................................... 367/27 |
| 4,855,963 | 8/1989 | Winbow et al. ........................ 367/31 |
| 4,964,101 | 10/1990 | Liu et al. ................................ 367/31 |
| 5,012,674 | 5/1991 | Millheim et al. ....................... 73/153 |
| 5,081,612 | 1/1992 | Scott et al. .............................. 367/38 |
| 5,109,697 | 5/1992 | Millheim et al. ....................... 73/153 |
| 5,142,500 | 8/1992 | Yamamoto et al. .................... 367/57 |
| 5,233,568 | 8/1993 | Kan et al. ............................... 367/27 |
| 5,265,016 | 11/1993 | Hanson et al. ........................ 364/422 |
| 5,583,825 | 12/1996 | Carrazzone et al. .................... 367/31 |
| 5,598,377 | 1/1997 | Fishburn et al. ........................ 367/31 |

FOREIGN PATENT DOCUMENTS

| | | |
|---|---|---|
| 2262340 | 6/1993 | (GB) . |
| 2276723 | 10/1994 | (GB) . |
| 2293653 | 4/1996 | (GB) . |
| WO9905545 | 2/1999 | (WO) . |

Primary Examiner—Donald E. McElheny, Jr.
(74) Attorney, Agent, or Firm—Alan H. Thompson

(57) ABSTRACT

The method of the invention is employed for determining the state of saturation in a subterranean formation using only seismic velocity measurements (e.g., shear and compressional wave velocity data). Seismic velocity data collected from a region of the formation of like solid material properties can provide relatively accurate partial saturation data derived from a well-defined triangle plotted in a $(\rho/\mu, \lambda/\mu)$-plane. When the seismic velocity data are collected over a large region of a formation having both like and unlike materials, the method first distinguishes the like materials by initially plotting the seismic velocity data in a $(\rho/\lambda, \mu/\lambda)$-plane to determine regions of the formation having like solid material properties and porosity.

22 Claims, 4 Drawing Sheets

DISCRIMINATION OF POROSITY AND FLUID SATURATION USING SEISMIC VELOCITY ANALYSIS

The United States Government has rights in this invention pursuant to Contract No. W-7405-ENG-48 between the United States Department of Energy and the University of California for the operation of Lawrence Livermore National Laboratory.

BACKGROUND OF INVENTION

Fluids play a pivotal role in many earth science problems. The most common tool used to analyze the fluid content in rocks and sediments is measurement of seismic (compressional and shear) wave velocities in the earth. Liquids reside underground by saturating—or only partially saturating—existing void space (porosity) in rock or soil. Two of the most important, and most difficult to measure, properties of subsurface rocks and fluids are porosity and saturation level.

Resolution of various practical and scientific issues in the earth sciences depends on knowledge of fluid properties underground. In environmental cleanup applications, the contaminant to be removed from the earth is often a liquid such as gasoline or oil, or ground water contaminated with traces of harmful chemicals. In commercial oil and gas exploration, the fluids of interest are hydrocarbons in liquid or gaseous form. In analysis of the earth structure, partially melted rock is one key to determining temperature and local changes of structure in the mantle. In all of these cases the most common tool used to analyze the fluid content is measurements of seismic (compressional and shear) wave velocities in the earth. The sources of these waves may be naturally occurring such as earthquakes, or man-made such as reflection seismic surveys at the surface of the earth, vertical seismic profiling, or still more direct transmission measurements using seismic/ultrasonic logging tools in either shallow or deep boreholes.

Underground fluids occupy voids between and among the solid earth grains. When liquid or gas completely fills interconnecting voids, a well-known result due to F. Gassmann's analysis "Uber die elastizitat poroser medien." *Vierteljahrsschrift der Naturforschenden Gesellschaft in Zurich*, 96, 1–23 (1951) predicts how the composite elastic constants that determine velocities should depend on the fluid and drained rock or soil elastic constants and densities. Gassmann's result is a low frequency calculation and both laboratory and well-log measurements of wave velocities at sonic and ultrasonic frequencies have been observed to deviate markedly from Gassmann's predictions. This is especially so for partial saturation conditions (i.e., when the fluid in each pore is a mixture of gas and liquid). In some cases these deviations can be attributed to "patchy saturation," meaning that some pores are fully saturated with liquid and others are filled with gas, so that Gassmann's formulas apply locally (but not globally) and must be averaged over space to obtain the overall seismic velocity of the system. In other cases, neither Gassmann's formulas nor the "patchy saturation" model seem to apply to seismic or ultrasonic data. In these cases a variety of possible reasons for the observed velocity discrepancies have been put forward, including viscoelastic effects (velocity decrement due to frequency-dependent attenuation), fluid-enhanced softening of intragranular cementing materials, chemical changes in wet clays that alter mechanical properties, etc.

Previous attempts at using seismic velocity data to determine the state of saturation of the earth have only been partially successful. A method employed for about the past 15 years has used changes in wave amplitude from seismic reflection surveys to infer the presence of fluid changes at interfaces. Such methods have been termed "amplitude versus offset" or AVO which is an advanced version of "bright spot analysis" methods employed in the late 1970's. Such methods have been limited to reflections and require interfaces between high contrast materials. Furthermore, previous methods have not used robust measures, i.e., measures that cannot be easily corrupted by either simple data errors or over-dependence on theoretical assumptions.

Presently, a need still exists to find a method of using seismic data obtained from either a transmission mode or reflection mode, but not necessarily requiring interfaces or reflections to estimate porosity and saturation. The method should be applicable regardless of whether the rock or soil fits the Gassmann, the patchy saturation, or some other model that is less dependent on the underlying causes of the above discrepancies, and thereby provides a robust means of discriminating the state of partial saturation, whatever the other effects might be that are caused by the presence of the fluid.

SUMMARY OF THE INVENTION

Briefly, the invention is directed to a method of estimating both the porosity and saturation level in a subterranean formation, as well as distinguishing the type of saturation, by displaying collected seismic velocity data on plots emphasizing the Lamé elastic parameter lambda, $\lambda$. A plotting method provides universal and easily interpretable behavior for sedimentary and igneous rocks, various unconsolidated materials, and man-made materials, by virtue of essentially all the seismic data for a fixed subterranean formation and porosity being plotted along straight lines. The slopes of such lines correlate well with porosity, while the locations of the data points along the lines provide approximations of fluid saturation. A resulting diagram is a quasi-orthogonal system with radial dependence on saturation and angular dependence on porosity.

Seismic velocity data provided by the two commonly measured parameters, $v_p$ and $v_s$ (compressional and shear wave velocities, respectively), are related in simple algebraic expressions and are related to the Lamé elastic parameters, lambda, $\lambda$, and mu, $\mu$, of elasticity theory, and the overall density, rho, $\rho$. In the invention, a primary method of displaying collected seismic velocity data from a region of the formation having like materials, i.e., having essentially constant shear modulus, is to plot data points of computed primary Lamé ratios, $\rho/\mu$ and $\lambda/\mu$, in a ($\rho/\mu$, $\lambda/\mu$)-plane—instead of (for example) the conventional ($v_p$, $v_s$)-plane. An advantage of this plot is that when the liquid and gas are either mixed homogeneously throughout or are fully segregated throughout (i.e., patchy saturation), most of the data fall along one of two straight lines.

When the seismic velocity data are collected over a large region of a formation having both like and unlike materials, an inverse method first distinguishes the like materials by initially plotting the seismic velocity data inverse computed Lamé ratios, $\rho/\lambda$ and $\mu/\rho$, in a ($\rho/\lambda$, $\mu/\lambda$)-plane. Virtually all seismic velocity data on partial saturation can be plotted with minimal scatter along straight lines in this plane. The length and slope of these lines have quantitative implications for measurements of both partial saturation and porosity, e.g., cones of data fanning out from the origin can be segregated into sets representing like materials that can then be usefully plotted in the above-mentioned ($\rho/\mu$, $\lambda/\mu$)-plane.

Accordingly, such useful relationships among seismic parameters, porosity and saturation estimations can be obtained for subterranean sites such as soil contamination sites and prospective oil and gas reservoirs.

DETAILED DESCRIPTION OF THE INVENTION

In the invention, measurements of seismic velocity data are collected from subterranean formations using either reflection or transmission geometries and methods. Collection methods can include crosswell or surface reflection geometries and vertical seismic profiling. In a feature of the invention, the seismic velocity data can be collected and interpreted from the transmission mode, although data from the reflection mode may also be utilized. In essence, the method includes initially distinguishing regions in a formation having similar or like solid material by employing an inverse plotting scheme of the collected seismic data (in a computed $(\rho/\lambda, \mu/\lambda)$-plane) and selecting cones of linear plots of the computed data that fan out from a common intercept. The data from a selected cone, a proxy for a formation region having a consistent porosity or constant shear modulus, are then plotted by a primary plotting method in a $(\rho/\mu, \lambda/\mu)$-plane wherein the $\rho/\mu$ computed data are an excellent proxy of homogeneous fluid saturation and the $\lambda/\mu$ computed data represent patchy saturation, particularly data collected at relatively low frequencies in the seismic frequency band. Within a resulting right triangular plot (or distribution) of computed seismic velocity data from the primary plotting method, the skilled artisan can determine the degree of patchy and homogeneous fluid saturation in a given formation. Although any fluid's partial saturation can be determined by the invention, mixtures of liquids, such as contaminant waste materials and/or naturally occurring mineral and fossil-derived oils, and gases, such as air, steam, $CO_2$, and/or hydrocarbon-containing gases, are most often determined by the invention.

Figure 1:
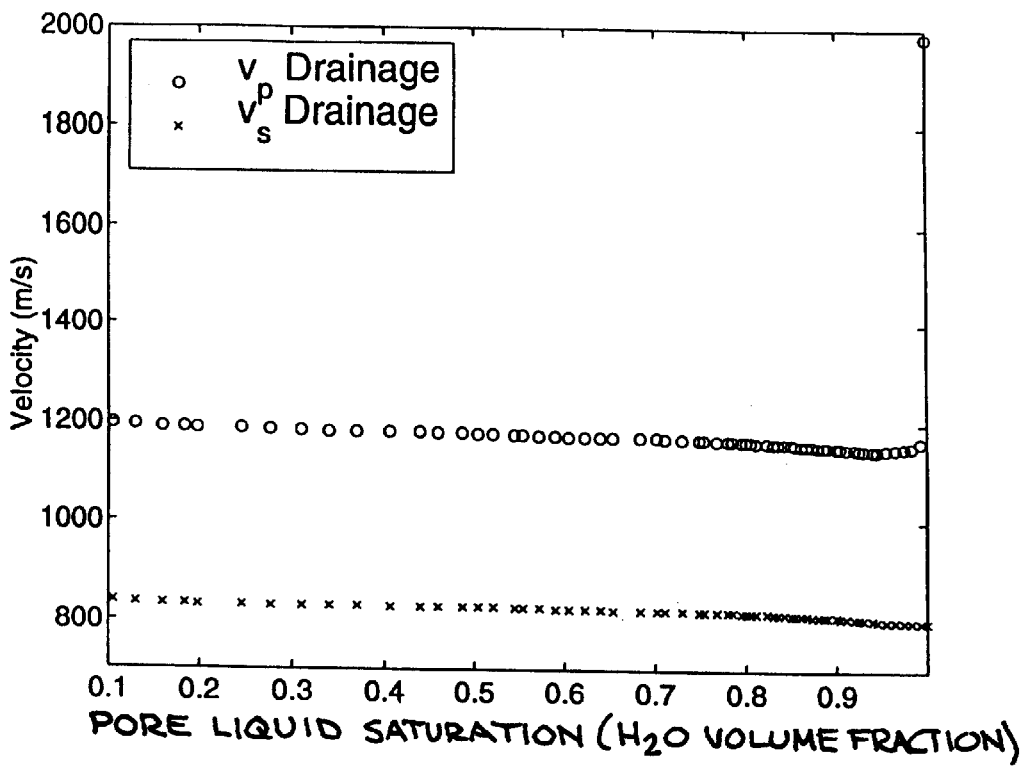
FIG. 1 illustrates an expected Gassmann plotting of a sandstone formation containing water and air.

The invention can be understood from a discussion of fundamental principles related to isotropic elastic materials such as those found in subterranean formations. For isotropic elastic materials there are two bulk elastic wave speeds, compressional, $v_p\sqrt{(\lambda+2\mu)/\rho}$ and shear, $v_s\sqrt{\mu/\rho}$. Here the Lamé parameters $\lambda$ and $\mu$ are the constants that appear in Hooke's law relating stress to strain in an isotropic material. The constant $\mu$ gives the dependence of shear stress on shear strain in the same direction. The constant $\lambda$ gives the dependence of compressional or tensional stress on extensional or dilatational strains in orthogonal directions. For a porous system with porosity $\phi$ (void volume fraction) in the range $0<\phi<1$, the overall density of the rock or sediment is just the volume weighted density given by $\pi=(1-\phi)\rho_s+\phi[S\rho_l+(1-S)\rho_g]$ where $\rho_s$, $\rho_l$, $\rho_g$ are the densities of the constituent solid, liquid and gas, respectively, and S is the liquid saturation (fraction of liquid-filled void space in the range $0 \leq S \leq 1$). When liquid and gas are distributed uniformly in all pores and cracks, Gassmann's equations say that, for quasistatic isotropic elasticity and low frequency wave propagation, the shear modulus $\mu$ is mechanically independent of the properties of any fluids present in the pores, while the overall bulk modulus $\lambda+\frac{2}{3}\mu$ of the rock or sediment, including the fluid, depends in a known way on porosity and elastic properties of the fluid and dry rock or sediment. Thus, in the Gassmann model, the Lamé parameter $\lambda$ (sometimes termed the incompressibility) is elastically dependent on fluid properties, while $\mu$ is not. The density $\rho$ also depends on saturation. At low liquid saturations, the fluid bulk modulus is dominated by the gas, and therefore the effect of the liquid on $\rho$ is negligible until full saturation is approached. Thus, both seismic velocities $v_p$ and $v_s$ can decrease with increasing fluid saturation due to the "density effect," i.e., the only quantity changing is the density which increases in the denominators of both $v_p^2$ and $v_s^2$. As full saturation is closely approached, the shear velocity continues its downward trend, while the compressional velocity suddenly (over a narrow range of change of saturation) shoots up to its full saturation value. An example of this behavior in a sandstone formation is shown in the seismic data plotting in FIG. 1, illustrating an expected (Gassmann) behavior of porous rocks at low frequencies (sonic and below). [Murphy, William F., III, *Effects of Microstructure and Pore Fluids on the Acoustic Properties of Granular Sedimentary Materials*, Ph.D. Dissertation, Stanford University, 1982. Murphy, William F., III, Acoustic measures of partial gas saturation in tight sandstones, *J.Geophys. Res.* 89, 11549–11559 (1984).]

Figure 2A:
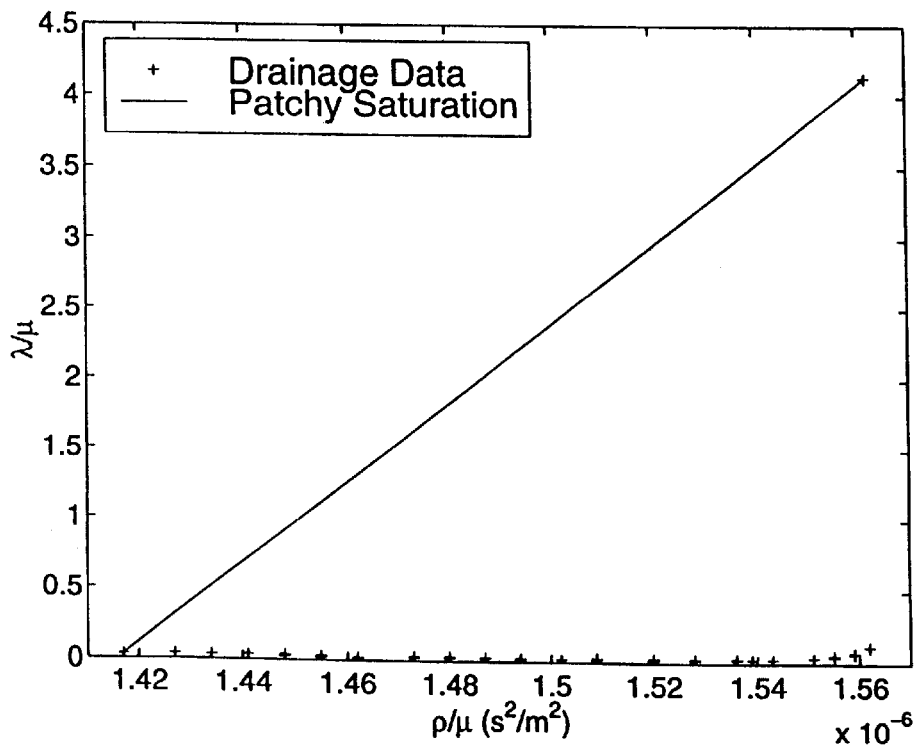
FIG. 2A illustrates a right triangular plotting for partial saturation of the sandstone of FIG. 1.

In order to separate effects of liquids on $\lambda$ from the effects of liquids on $\rho$ while taking advantage of the fluid-effect independence of $\mu$, a combination of the $v_p$ and $v_s$ data into a primary type of plot is employed by the invention For porous materials that satisfy Gassmann's conditions and low enough frequencies, plotting seismic velocity data in a two-dimensional array with one axis being $\rho/\mu=1/v_s^2$ (typically abscissa) and the other being the ratio $\lambda/\mu=(v_p/v_s)^2-2$(typically ordinate), results in a straight (horizontal) line until S is approximately equal to 1 (around 95% or higher), where the quickly rises to a value determined by the velocities at full liquid saturation. This behavior can be observed in FIG. 2A for the same sandstone as in FIG. 1. Note that, although this behavior is qualitatively similar to that of $v_p$ in FIG. 1, only the seismic velocities themselves are utilized (no saturation data are required to generate this plot, although in this case saturation can be inferred from it at least qualitatively).

If all the other assumptions of the Gassmann model are satisfied, but the liquid and gas are not distributed uniformly (so that different pores have different saturation levels), then the circumstances may better fit a "patchy saturation" model, such as the models of Endres and Knight, Mavko and Nolen-Hoeksema, or Dvorkin. [Endres, A. L., and Knight, R., The effect of microscopic fluid distribution on elastic wave velocities, *Log Anal.* 30, 437–444 (1989). Mavko, G. and Nolen-Hoeksema, R., Estimating seismic velocities at ultrasonic frequencies in partially saturated rocks, *Geophysics* 59, 252–258 (1994). Dvorkin, J. and Nur, A., Acoustic signatures of patchy saturation, *Int. J. Solids Struct.* 35, 4803–4810 (1998).] In such a case, for the plot of $\lambda/\mu$ vs. $\rho/\mu$ instead of data following a horizontal line with a jump up at the high saturation end (e.g., FIG. 1), the ideal patchy saturation model (for completely segregated liquid and gas pockets) can predict that the data lie on another straight line connecting to the two end points (dry and saturated) on this plot. These straight lines have been superimposed on the plots for FIG. 2A. The anticipated behavior has been observed in other data for typical formation materials.

Figure 2B:
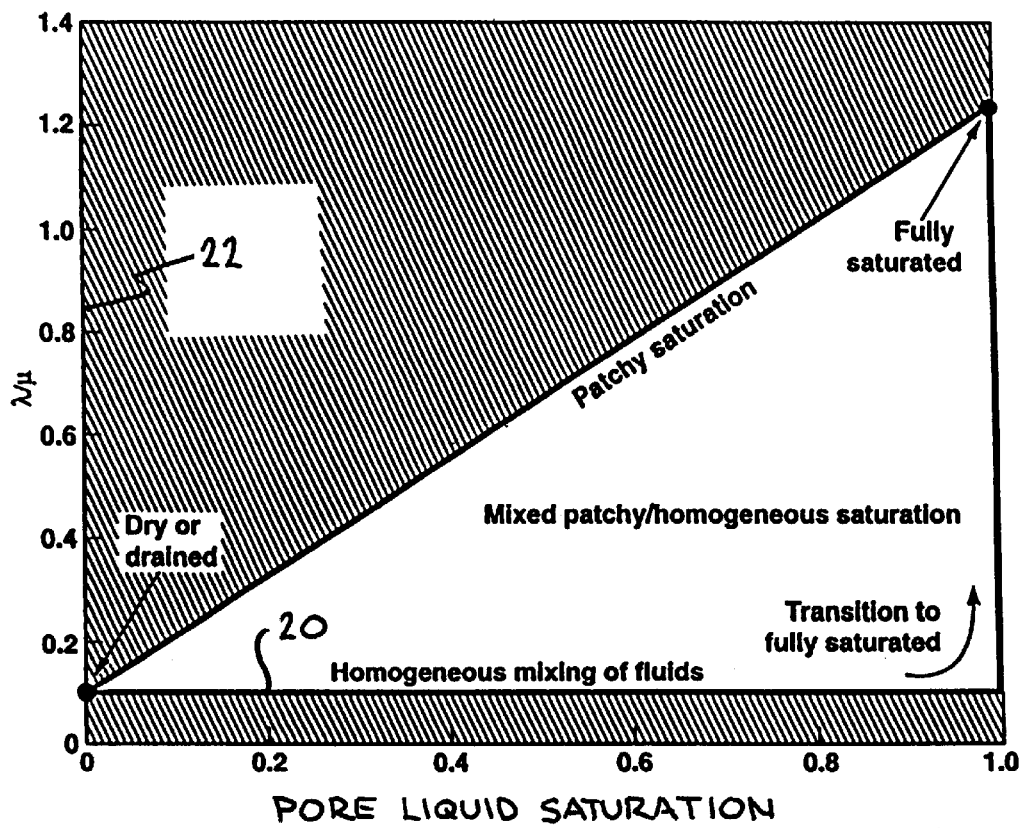
FIG. 2B represents a primary plotting model employed by the method of the invention.
Figure 7:
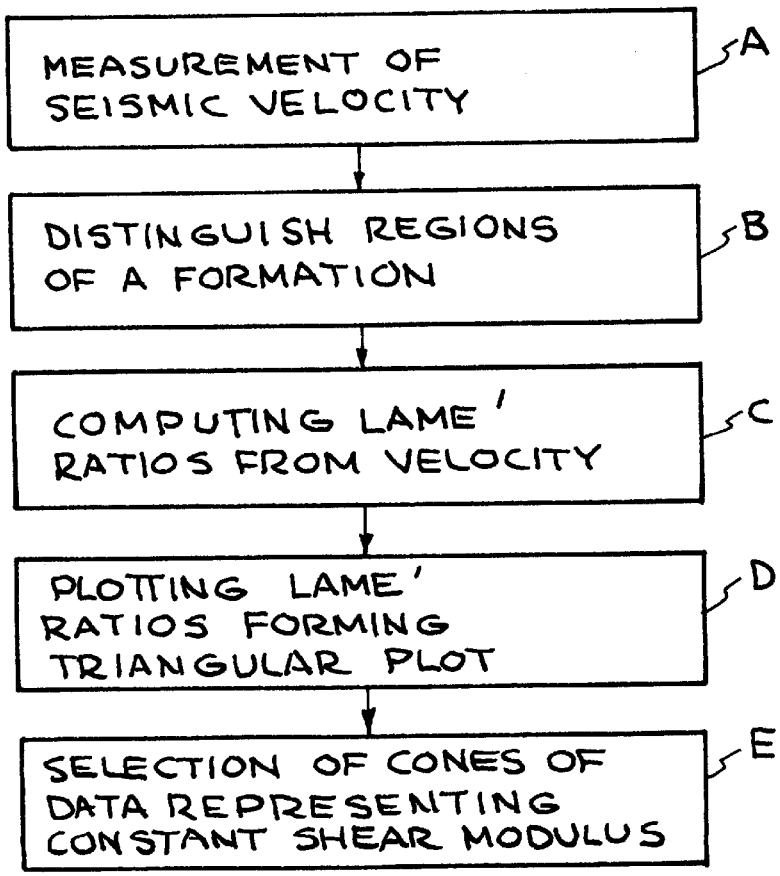

For a region of a subsurface formation having like solid material characteristics, the primary plotting method of the invention allows the skilled artisan to obtain an accurate measure of the degree of homogeneous mixing of fluids and patchy saturation ranging from a dry or drained level to a fully saturated level. All the seismic velocity data can be plotted within the coordinates of the essentially right triangular area shown in FIG. 2B illustrating the primary plotting method of the invention. In FIG. 2B, one axis (e.g., abscissa 20), graduated from 0 to 1.0, represents the liquid saturation as obtained from its proxy, $\rho/\mu$, calculated from the earlier described expression $1/v_s^2 = \rho/\mu = [\rho_{solid} \times (1-\phi) + \phi(S \times \rho_{liquid} + (1-S)\rho_{gas})]/\mu$ (and equivalents). The other axis of FIG. 2B (e.g., ordinate 22), represents the patchy saturation data as $\lambda/\mu$ (calculated as above, and equivalents) that can reach a maximum value at full saturation. (See part C of the flow chart of FIG. 7) The two straight lines of plotted seismic data fall within such coordinates, one a horizontal line and the other a diagonal from zero to 100 percent patchy saturation, thus forming the right triangular plot. (See part D of the flow chart of FIG. 7) The degree of mixed patchy and homogeneous saturation for the region of like material characteristics is readily interpreted from the nature of the plot within the triangular area. Although a minimum of three data points must be plotted for interpretable saturation and porosity information about a formation, more than three, and typically a plurality of data points scattered within the triangular plot (or cone) provide even better indications of the targeted formation characteristics. The method is particularly effective for seismic velocities collected at frequencies of less than 1 kHz.

Figure 3:
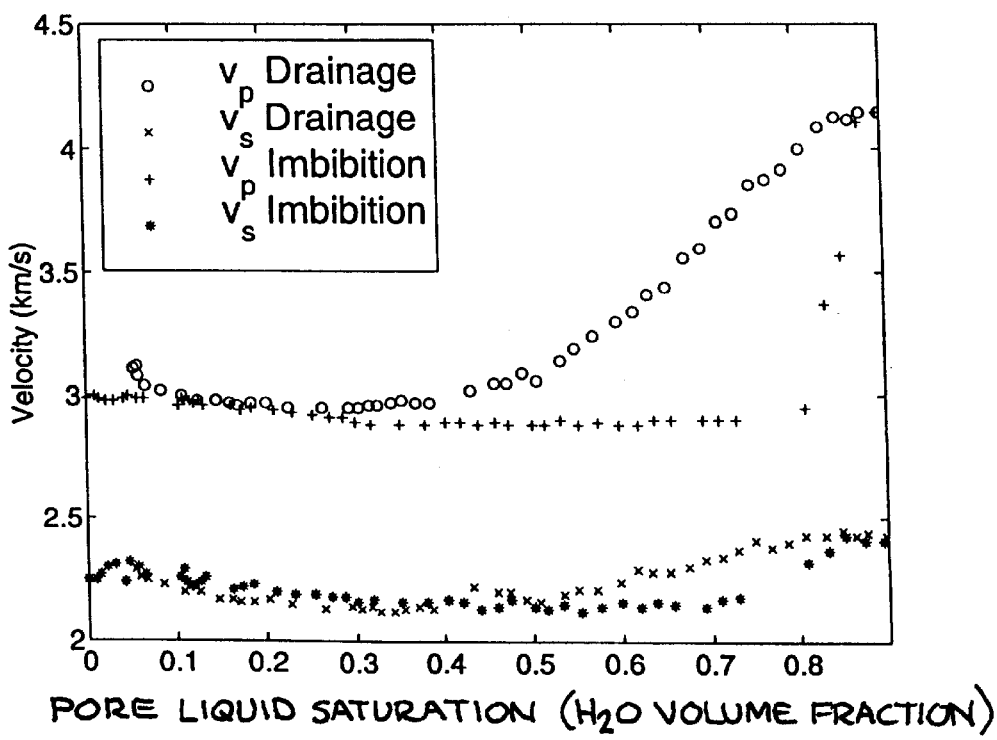
FIG. 3 illustrates a plotting of seismic velocities vs. saturation in a second sandstone formation.
Figure 4:
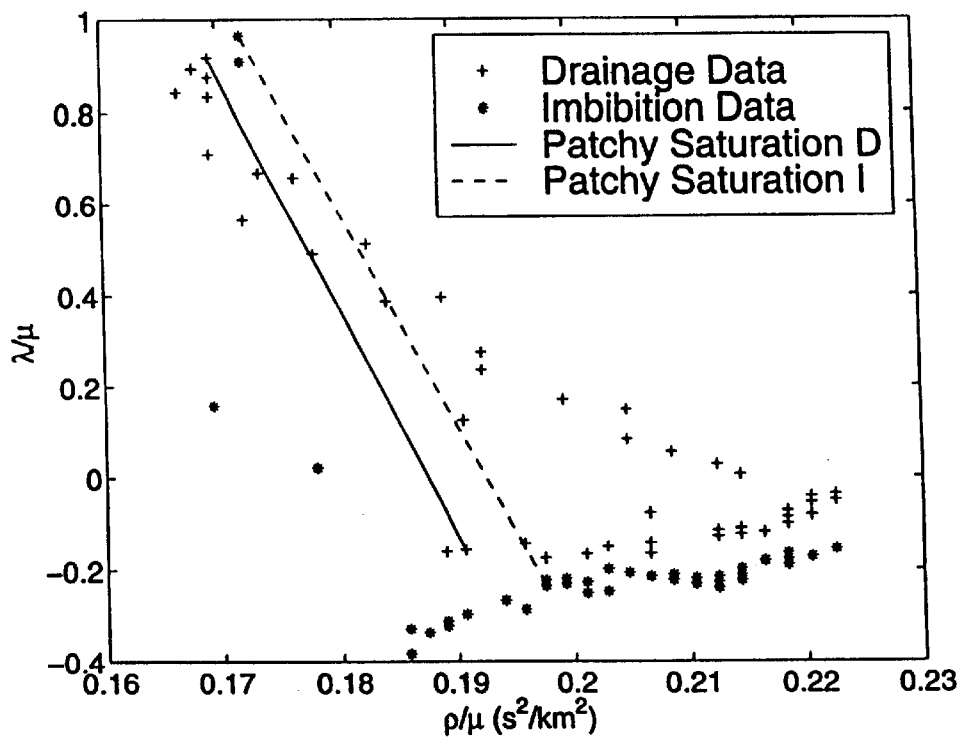
FIG. 4 illustrates a plotting of high frequency velocities of the sandstone of FIG. 3 in a $(\rho/\mu, \lambda/\mu)$-plane where Gassmann's equation is not valid.

Plots of velocity versus saturation and of $\lambda/\mu$ versus $\rho/\mu$ for a sandstone that does not behave according to Gassmann's model are shown in FIGS. 3 and 4 where the data were collected at high frequencies. As discussed herein, the plotting of the proxy for lambda, $\lambda/\mu$, vs. the proxy for saturation, $\rho/\mu$, deviates from expected Gassmann behavior. These apparent deviations from the range of expected behaviors (from purely homogeneous mixed fluids to purely segregated patchy saturation) can be resolved by including another display (FIG. 5) of seismic data recorded at lower frequencies, e.g., 500 kHz, for the same sandstone formation. The ratio $\lambda/\mu$ is plotted versus saturation measured in the laboratory, and it has been observed that the basic plot structures anticipated for FIG. 4 have been confirmed in FIG. 5. Thus, the quantity $\rho/\mu$, desired for use as a proxy for the saturation S, is not a very good proxy at high frequencies, such as above 500 kHz, but can be good at low frequencies, e.g., 1–10 kHz or below. The discrepancies observed in FIG. 4 can be attributed to effects of high frequency dispersion as predicted by the conventional Biot's theory. Even the seemingly odd negative slope of the patchy saturation lines in FIG. 4 can be understood as a predicted high frequency effect on the shear velocity. In any event, the method of the invention usually should not be applied to high frequency (nonseismic) data, except under especially favorable circumstances.

The above innovative primary plotting method is at least partially constrained by the implicit assumptions that the shear modulus is independent of the presence of fluids and that frequency dispersion for shear velocity is negligible. Such an assumption that the materials' shear properties are independent of the fluid is based on predictions about mechanical behavior only, and any chemical interactions between fluid and rock that might soften grain contacts could easily account for some of these discrepancies. Fluid-induced swelling of either interstitial or intergranular clays is another possible source of discrepancy as is fluid-induced pressure effects if the fluid is overpressured and therefore tending to severely weaken the rock. All of the chemical effects mentioned should become active with even very small amounts of fluid present, but do not have any significant frequency dependence (at least within the seismic frequency band).

Limestones and other formation materials behave very much like the sandstones discussed herein, and such others follow the Gassmann predictions very well all the way up to the ultrasonic frequency regime. There were several other limestones that have been found to have similar if not quite such good behavior. On the other hand, there were two limestone samples (a granular Lavoux limestone and an Espeil limestone) that have been found to have very strong dispersion in the ultrasonic frequency band. These materials do not behave as expected when the data are plotted as in either FIG. 3 or FIG. 5. However, since compressional wave and shear wave data at 1 kHz have also been collected for these same samples, computing necessary quantities and plotting them (not shown) for these two materials indicates that even for these two badly behaved materials (in the ultrasonic band) the plots at lower frequency become easy to interpret again. Such results provide a very strong indication that plots such as those in FIGS. 3 and 4 can be readily interpreted for all porous materials at seismic frequencies.

Many materials do not obey Gassmann's equations, especially for seismic wave propagation at higher frequencies such as the sonic and ultrasonic frequencies used in collecting laboratory or some well-log data. Examples of this divergence in behavior is shown in FIGS. 3 and 4. With the exception of $v_p$ for imbibition in FIG. 4, neither of the curves behaves like the corresponding ones in FIGS. 1 and 2A and 2B. One very noticeable difference is in FIG. 4 the curve for drainage data appear to have some relatively smooth, but not one-to-one relationship of the abscissa values with those on the ordinate. Thus, the $(\rho/\mu, \lambda/\mu)$ planar method of display is of limited usefulness for these high frequency examples, and for many others like them.

In the invention it is important to compare only solid material properties in the formation that do not change rapidly, i.e., like materials, and to provide means for segregating the collected seismic data from like and unlike material formations. By making an adjustment in the primary method of display, the essence of the invention is derived. Since the expected behavior for Gassmann materials as observed in FIG. 1 is a horizontal straight line for most values of saturation, (i.e., $\rho/\mu$) is expected to be almost constant until high saturation levels are reached, the division of $\rho/\mu$ by $\lambda/\mu$ and then "inverse" plotting the points again in the $(\rho/\lambda, \mu/\lambda)$-plane is accomplished (using the inverse of the ordinate from the previous display). In the straight-line portion of the curve from FIG. 2A, the only effect is a change of scale, but large changes result in the points representing full saturation or nearly full saturation. The results of this inverse plotting method are displayed as observed straight lines in an example shown in FIG. 6. Such linear behavior can be derived from a Gassmann material, since $\lambda$ is just a scaling factor, $\mu$ is unaffected by saturation, and $\rho$ is linearly dependent on saturation. It would also be expected for a non-Gassmann material in which the effect of fluids on $\lambda$ is negligible compared to the effect on $\mu$. It may also be expected for the case of patchy saturation if chemical interactions cause $\mu$ to change with saturation, since $\mu$ for the porous medium would be some weighted average of $\mu$ for the dry case and $\mu$ for the fully saturated, chemically altered portions of the rock.

Figure 5:
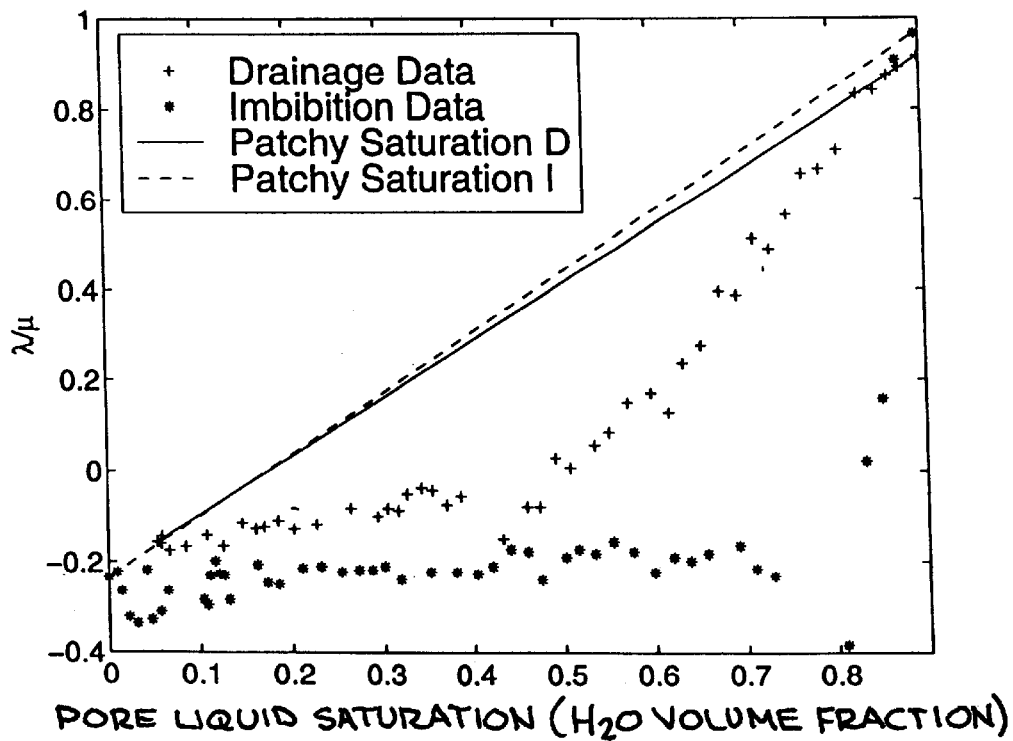
FIG. 5 illustrates a plotting of 500 kHz recorded seismic velocities vs. saturation from the second sandstone formation.
Figure 6:
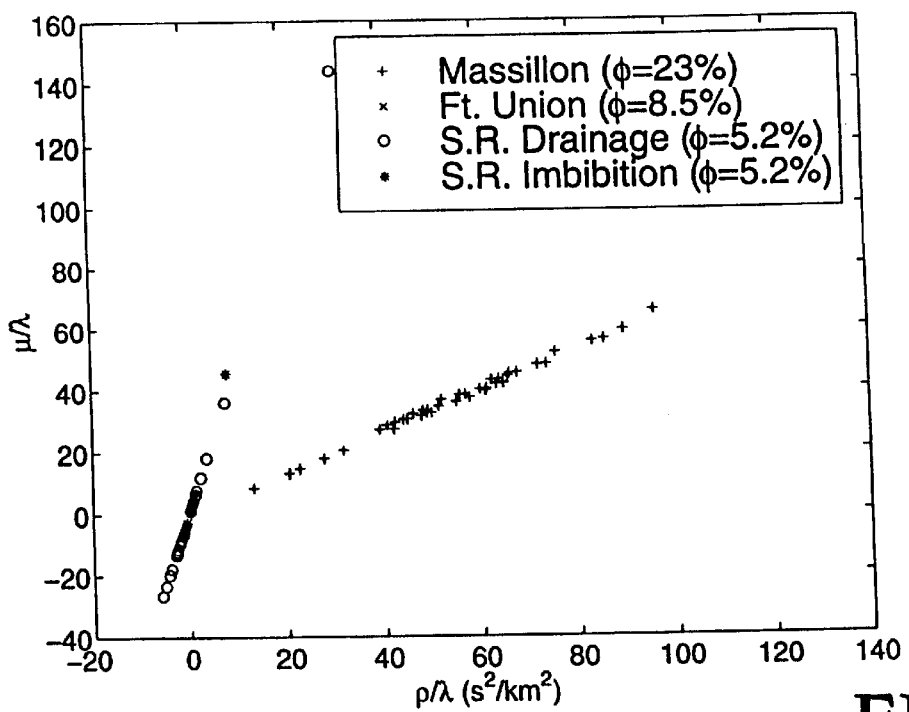
FIG. 6 illustrates a plotting of seismic velocities in a $(\rho/\lambda, \mu/\lambda)$-plane from sandstone formations.

FIG. 6 illustrates the inverse plotted ($\rho/\lambda$, $\mu/\lambda$)-plane for the same sandstone data as shown in FIGS. 1–5. Numerous other examples of the correlation have been observed. Examples of appropriate data for partially saturated samples without major deviations from this behavior have been observed, including an extensive survey of available data sets having been performed for materials including limestones, sandstones, granites, unconsolidated sands, and some artificial materials such as ceramics and glass beads. This straight line correlation is a very robust feature of partial saturation data.

Ordinarily the initial step after collection of the seismic velocity data in the method of the invention is to distinguish regions of like solid content, i.e., segregating the collected seismic velocity data into regions of the formation having a constant shear modulus. A series of straight lines obtained from the inverse plotting method in the ($\rho/\lambda$, $\mu\lambda$)-plane provides cones of seismic data fanning out from the intercepts of the lines. The $\rho/\lambda$ axis of the plot is readily obtained from the expression $1/(v_p^2 - 2v_s^2)$ (and equivalents) and the $\mu/\lambda$ axis is obtained from the expression $v_s^2/(v_p^2 - 2v_s^2)$ (and equivalents) (see part E of flow chart of FIG. 7). The cones of data can be readily interpreted to represent solid material in a region of the formation having an essentially constant shear modulus and/or porosity.

An additional feature of displays of the type presented in FIG. 6 is that the slopes of the straight lines, at least for samples of similar material character, are inversely correlated with the porosity of the samples, i.e., the lower porosity lines having higher slopes and higher porosity lines having lower slopes. This display provides a more sensitive means of determining relative porosity values (i.e., which materials have higher or lower porosities) than traditional laboratory measurements.

In a diagram using the ($\rho/\mu$, $\lambda/\mu$)-plane, any plot of data using linear combinations of the form ($\rho/\mu$, $\lambda+c\mu)/\mu$), where c is any real constant, has essentially the same information and the display is essentially identical except for a translation of the values along the ordinate by the constant value c. Thus, for example, taking c=⅔, plots of ($\rho/\mu$, K/$\mu$), have the same interpretational value as those presented herein before. In the inverse type of plot for each of these choices, an analysis of the plots of the form ($\rho/(\lambda+c\mu)$, $\mu/(\lambda+c\mu)$) should occur. An optimum choice of the parameter c makes the plots as straight as possible whenever the only variable is the fluid saturation. The class of best choices lies in the middle of the range of values of I/g taken by the data. Thus, setting $-c=\frac{1}{2}\min(\lambda/\mu)+\max(\lambda/\mu))$ essentially guarantees that there are very large positive and negative values of $\mu/(\lambda+c\mu)$, and accordingly, these data fall reliably (if somewhat approximately) along a straight line. The minimum value of $\lambda/\mu$ has an absolute minimum of $-\frac{2}{3}$, based on the physical requirement of positivity of K. So c <⅔ is a physical requirement, and since max lambda/mu as approximately equal to +⅔ is a fairly typical value for porous rocks, then an optimum value of c≦0 can generally be obtained using this criterion. Thus, plots based on bulk modulus K instead of $\lambda$ will not be as effective in producing the quasi-orthogonality of porosity and saturation that have been obtained in the herein presented inverse style of plotting. Thus, the choice $\lambda$ is an especially simple choice and effective for most seismic velocity data.

The new plotting strategies described herein provide methods for estimating both porosity and saturation from seismic data as well as for distinguishing types of fluid saturation present in the earth. Although in well-logging relatively high frequencies above 1 kHz can be utilized, the methods of the invention apply effectively to low frequency (seismic) data, ordinarily less than 1,000 Hz (1 kHz), and generally in the range from about 5 to 500 Hz (for example, in crosswell tomography) or 10 to 100 Hz (for example, from reflection surveys), whether or not they fit Gassmann's model or a patchy saturation model. At the relatively low frequencies, the type of saturation present (well-segregated liquids and gases, homogeneous fluid mixtures, or some patchy saturation state intermediate between these two extremes) determines the data location on the ($\rho/\mu$, $\lambda/\mu$)-plane. High frequency (ultrasonic) data are more likely to contain wave attenuation and dispersion effects that complicate the interpretations based on the invention, however, as discussed herein, they nevertheless do not seriously affect the interpretations based on Lamé's elastic parameter $\lambda$ as long as the data are taken in a range of frequencies that avoids the largest dispersive effects. Porosity is correlated inversely with the slopes of the data-distribution lines in the ($\rho/\lambda$, $\mu/\lambda$)-plane (see FIG. 6). This fact can be used to sort data into subsets having similar or like material characteristics and porosities for display on the more sensitive ($\rho/\mu$, $\lambda/\mu$) plots. FIG. 5 illustrates that saturation is an approximately (within normal data scatter) monotonic function of $\lambda/\mu$ (as in FIGS. 3 and 4), and therefore also of $\mu/\lambda$ (as in FIG. 6). Saturation can be estimated from knowledge of location along the lines of FIG. 6 and relative changes of saturation can be determined with a high level of confidence. After sorting seismic data by material characteristics and porosity using the ($\rho/\lambda$, $\mu/\lambda$)-diagram, the resulting data subsets can then be displayed in the ($\rho/\mu$, $\lambda/\mu$)-plane and used to infer the local states of saturation.

Changes and modifications in the specifically described embodiments can be carried out without departing from the scope of the invention which is intended to be limited only by the scope of the claims.

I claim:

1. A method for determining fluid saturation levels in a subterranean formation, said method comprising:
    measuring seismic velocities in said formation;
    distinguishing one or more regions of said formation having essentially constant shear modulus;
    computing primary Lamé ratios from said velocities; and
    forming a right triangular plot of said ratios from said regions, said plot including (1) one leg representing homogeneous fluid saturation, (2) the hypotenuse representing patchy fluid saturation and (3) an interior representing mixed patchy and homogeneous fluid saturation in said formation.

2. The method of claim 1 wherein velocity data having an essentially constant shear modulus is derived from a cone shaped linear plotting of said seismic velocities in a computed ($\rho/\lambda$, $\mu/\lambda$)-plane.

3. The method of claim 1 wherein said right triangular plot is within a computed ($\rho/\mu$, $\lambda/\mu$)-plane.

4. The method of claim 1 wherein said fluid comprises a homogenous mixture of liquids and gases.

5. The method of claim 1 wherein said seismic velocities are collected in a direct transmission mode.

6. The method of claim 1 wherein said seismic velocities are collected in a refection mode.

7. The method of claim 1 further comprising interpreting said right triangular plot to determine a level of saturation within said formation.

8. The method of claim 1 wherein said seismic velocities comprise frequencies less than 1 kHz.

9. The method of claim 1 wherein said seismic velocities comprise frequencies in the range from about 5 to about 500 Hz.

10. The method of claim 1 wherein said seismic velocities comprise frequencies in the range from about 10 to about 100 Hz.

11. A method for distinguishing two or more regions of a subterranean formation having essentially like material characteristics, said method comprising:

measuring seismic velocity data comprising compressional and shear waves collected from said formation;

computing inverse Lamé ratios from said velocity data;

plotting said ratios in a computed $(\rho/\lambda, \mu/\lambda)$-plane to produce one or more cones of linear data radiating from an essentially common intercept; and selecting at least one cone of said linear data as representing a solid material of said formation as having an essentially constant shear modulus and/or porosity.

12. The method of claim 11 further comprising plotting said linear data selected from said computed $(\rho/\lambda, \mu/\lambda)$-plane and replotting said seismic velocity data within a $(\rho/\mu, \lambda/\mu)$-plane to produce a scatter of data falling within a right triangular plot, and interpreting said plot to determine a level of saturation in said formation.

13. The method of claim 11 wherein said velocity data comprising frequencies less than 1 kHz.

14. The method of claim 11 wherein said seismic velocity data are collected in a direct transmission mode.

15. The method of claim 11 wherein said seismic velocity data are collected in a reflection mode.

16. A method for determining a relative level of fluid saturation in a subterranean formation, said method comprising:

measuring seismic velocity data comprising compressional and shear waves collected from said formation;

computing primary Lamé ratios from said seismic velocity data; and plotting said primary Lamé ratios in a $(\rho/\mu, \lambda/\mu)$-plane to form a right triangular plot wherein said plotted $\rho/\mu$ data represent homogeneous fluid saturation and said $\lambda/\mu$ data represent patchy saturation.

17. The method of claim 16 wherein said plotted data within said right triangular plot represents a degree of both homogeneous fluid saturation and patchy saturation.

18. The method of claim 17 further comprising prior to plotting said primary Lamé ratios:

computing inverse Lamé ratios from said seismic velocity data;

plotting said ratios in a computed $(\rho/\lambda, \mu/\lambda)$-plane to produce one or more cones of linear data radiating from an essentially common intercept; and selecting at least one cone of said linear data as representing a solid material of said formation as having an essentially constant shear modulus and/or porosity.

19. The method of claim 18 where in said right triangular plot comprises a plurality of data points.

20. The method of claim 19 wherein said fluid comprises a homogeneous mixture of liquids and gases, said liquids comprising contaminant waste material or a naturally occurring oil, and said gases comprising air, $CO_2$, steam, or hydrocarbon-containing gases.

21. The method of claim 19 wherein said seismic velocity data are collected in a direct transmission mode.

22. The method of claim 19 wherein said seismic velocity data are collected in a reflection mode.

* * * * *